United States Patent [19]
Hayes et al.

[11] Patent Number: 5,909,697
[45] Date of Patent: Jun. 1, 1999

[54] REDUCING CACHE MISSES BY SNARFING WRITEBACKS IN NON-INCLUSIVE MEMORY SYSTEMS

[75] Inventors: Norman M. Hayes, Sunnyvale; Ricky C. Hetherington, Pleasanton; Belliappa M. Kuttanna, Sunnyvale; Fong Pong, Mountain View; Krishna M. Thatipelli, Fremont, all of Calif.

[73] Assignee: Sun Microsystems, Inc., Palo Alto, Calif.

[21] Appl. No.: 08/940,219

[22] Filed: Sep. 30, 1997

[51] Int. Cl.$^6$ ................................................. G06F 12/02
[52] U.S. Cl. ............................ 711/144; 711/122; 711/133
[58] Field of Search ................................. 711/122, 120, 711/121, 141, 3, 144, 118, 128, 138, 1

[56] References Cited

U.S. PATENT DOCUMENTS

| | | | |
|---|---|---|---|
| 5,155,828 | 10/1992 | La Fetra et al. | 711/122 |
| 5,155,832 | 10/1992 | Hunt | 711/120 |
| 5,303,362 | 4/1994 | Butts, Jr. et al. | 711/121 |
| 5,369,753 | 11/1994 | Tipley | 711/122 |
| 5,524,233 | 6/1996 | Milburn et al. | 711/141 |
| 5,542,062 | 7/1996 | Taylor et al. | 711/3 |
| 5,564,035 | 10/1996 | Lai | 711/144 |
| 5,577,227 | 11/1996 | Finnell et al. | 711/122 |
| 5,603,004 | 2/1997 | Kurpanek et al. | 711/118 |
| 5,651,135 | 7/1997 | Hatakeyama | 711/128 |
| 5,696,936 | 12/1997 | Church et al. | 711/138 |
| 5,717,890 | 2/1998 | Ichida et al. | 1/1 |

OTHER PUBLICATIONS

Afek, et al., "A Lazy Cache Algorithm," Association for Computing Machinery, 0–89791–323–X, 1989, pp. 209–223.

Brown, G., "Asynchronous multicaches," Distributed Computing, vol. 4, pp. 31–36; 1990.

*Primary Examiner*—Tod R. Swann
*Assistant Examiner*—Fred F. Tzeng
*Attorney, Agent, or Firm*—D'Alessandro & Ritchie

[57] ABSTRACT

A non-inclusive multi-level cache memory system is optimized by removing a first cache content from a first cache, so as to provide cache space in the first cache. In response to a cache miss in the first and second caches, the removed first cache content is stored in a second cache. All cache contents that are stored in the second cache are limited to have read-only attributes so that if any copies of the cache contents in the second cache exist in the cache memory system, a processor or equivalent device must seek permission to access the location in which that copy exists, ensuring cache coherency. If the first cache content is required by a processor (e.g., when a cache hit occurs in the second cache for the first cache content), room is again made available, if required, in the first cache by selecting a second cache content from the first cache and moving it to the second cache. The first cache content is then moved from the second cache to the first cache, rendering the first cache available for write access. Limiting the second cache to read-only access reduces the number of status bits per tag that are required to maintain cache coherency. In a cache memory system using a MOESI protocol, the number of status bits per tag is reduced to a single bit for the second cache, reducing tag overhead and minimizing silicon real estate used when placed on-chip to improve cache bandwidth.

29 Claims, 4 Drawing Sheets

REDUCING CACHE MISSES BY SNARFING WRITEBACKS IN NON-INCLUSIVE MEMORY SYSTEMS

BACKGROUND OF THE INVENTION

1. Field of the Invention

The present invention relates to cache memory systems. More particularly, the present invention relates to non-inclusive hierarchical cache memory systems.

2. Background

Processors have achieved large gains in instruction processing bandwidth while the bandwidths of memory systems have not kept pace, resulting in a bandwidth mismatch between memories and processors. Memory bandwidth is the speed with which a memory device or system can transfer data from memory. Providing adequate memory bandwidth for a processor depends on the system architecture and the application requirements. One common solution for providing large memory bandwidths includes using a cache memory system that minimizes store or fetch latency ("memory latency") of instructions and/or data ("data") to or from main memory, respectively.

However, processors have continually increased in processing speed, increasing the need to provide even faster and more efficient cache memory systems so that such processors do not starve for want of data to process. Such a need for sufficient memory bandwidth is further exacerbated with computer systems having superscalar pipelined processors and/or processors that employ out-of-order processing which are commonly employed today. Superscalar processors have the ability to perform multiple instructions in parallel or in a single clock cycle, while out-of-order processors have the ability to execute instructions when their data is ready rather than in sequential order.

Accordingly, it would be desirable to provide an apparatus and method that optimizes a hierarchical cache memory system so that the amount of main memory fetches due to a cache miss are minimized.

SUMMARY OF THE INVENTION

The present invention is a method and apparatus for optimizing a non-inclusive multi-level cache memory system. In accordance with a preferred embodiment of the present invention, cache space is provided in a first cache by removing a first cache content, such as a cache line or block, from the first cache. The removed first cache content is stored in a second cache. This is done in response to a cache miss in the first and second caches. All cache contents that are stored in the second cache are limited to have read-only attributes so that if any copies of the cache contents in the second cache exist in the cache memory system, a processor or equivalent device must seek permission to access the location in which that copy exists, ensuring cache coherency.

If the first cache content is required by a processor such as when a cache hit occurs in the second cache for the first cache content, room is again made available, if required, in the first cache by selecting a second cache content from the first cache and moving it to the second cache. Once room is available in the first cache, the first cache content is moved from the second cache to the first cache, rendering the first cache available for write access.

Limiting the second cache to read-only access reduces the number of status bits per tag that are required to maintain cache coherency. In a cache memory system using a MOESI protocol, the number of status bits per tag is reduced to a single bit for the second cache, reducing the tag overhead, such as the amount of silicon space used to implement to the tags. This results in an optimization advantage because the tags may be placed on-chip to optimize cache bandwidth usage without using a large amount of on-chip silicon space that normally would be required if tag overhead was not reduced.

DETAILED DESCRIPTION OF A PREFERRED EMBODIMENT

In the following description, a preferred embodiment of the invention is described with regard to preferred process steps and data structures. Those skilled in the art would recognize after perusal of this application that embodiments of the invention can be implemented using one or more general purpose processors operating under program control, or special purpose processors adapted to particular process steps and data structures, and that implementation of the process steps and data structures described herein would not require undue experimentation or further invention.

System Architecture

Figure 1:
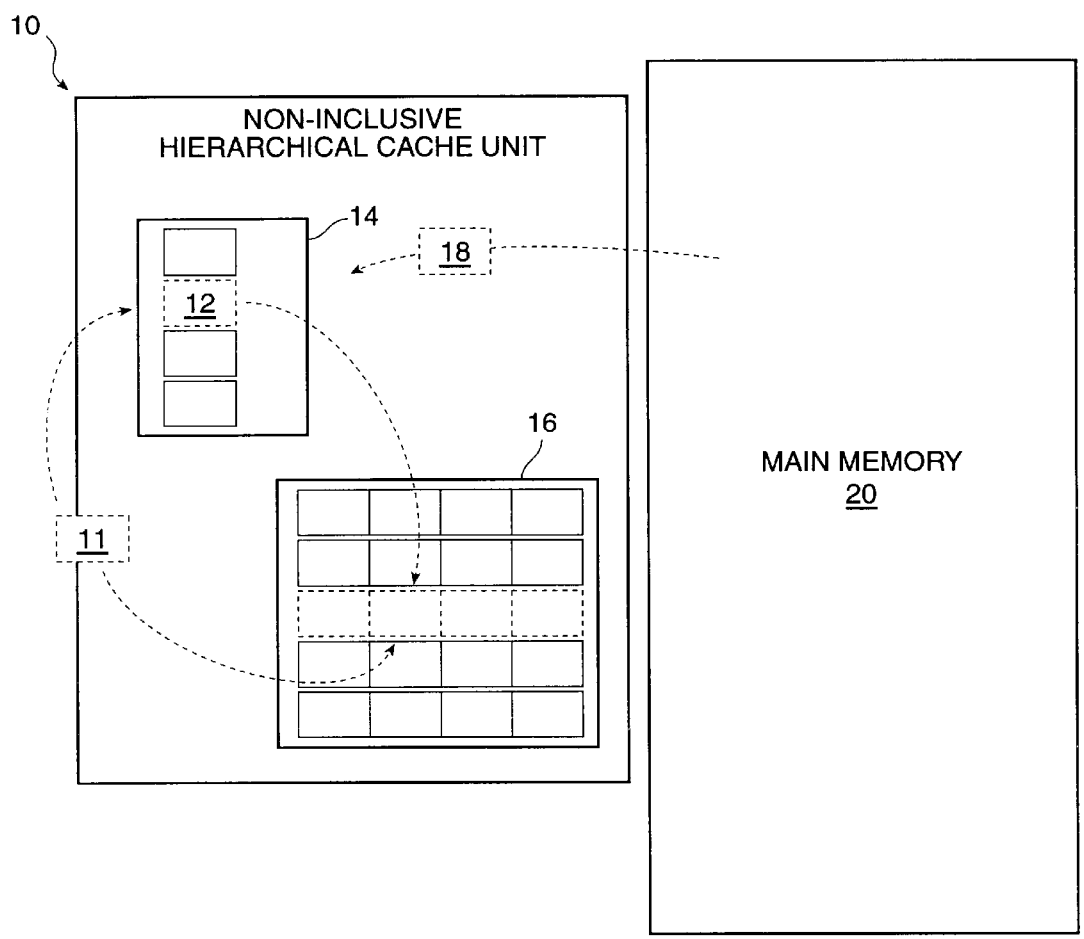
FIG. 1 is a block diagram illustrating the interrelationship between two hierarchial caches that hold data non-inclusively when used to snarf writebacks in accordance with a preferred embodiment of the present invention.

FIG. 1 is a block diagram illustrating the interrelationship between two hierarchial caches that hold data non-inclusively in accordance with a preferred embodiment of the present invention.

The present invention optimizes the caching of information in a hierarchical non-inclusive cache unit 10 by transferring information 11 held in a cache line 12 from a first cache 14 into a larger second cache 16 when a cache miss results in both first cache 14 and second cache 16 and a corresponding fetch to main memory to service the cache miss occurs ("snarfing write-backs"). The space made available in first cache 14 can then be made available for information 18 obtained from a main memory 20 (or an equivalent memory store) as a result of the cache miss and main memory fetch. Information 11, which is now stored in second cache 16, can then made available for return to first cache 14 should it be needed in a subsequent cache transaction. For example, when a cache miss occurs in first cache 14 but a cache hit for information 11 occurs in second cache 16.

The above provides the advantage of avoiding fetches to main memory 20 that would otherwise occur if information, such as information 11, that was replaced from the first cache 14 was not kept in larger second cache 16 and was later needed. If such information is indeed later needed, such as when a cache miss occurs in first cache 14 and a cache hit occurs in second cache 16, it can be pulled from second cache 16 and placed into first cache 14 to service the cache hit. This optimizes the operation of a non-inclusive hierarchical cache since the potential number of main memory fetches arising from a capacity miss in first cache 12 is reduced. As known in the art, main memory fetches impose much longer memory latencies than do fetches from cache memory because main memory, although very large compared to cache memory, is much slower.

The return of information 11 into first cache 14 is accomplished by removing information, such as information 18, from first cache 14 to make room for the return of information 11. Information 18 is stored in the space previously occupied by information 11 (or equivalent space) in second cache 16. Storing information 18 in second cache 16 preserves information 18 should it be needed in a subsequent cache transaction, such as when a cache miss for information 18 occurs in first cache 14 but a cache hit occurs in second cache 16. This avoids the need to perform a fetch to main memory for information 18 and has the effect of reducing the capacity miss potential of first cache 14.

To simplify the transfer of information between first cache 14 and second cache 16, second cache 16 has a cache line size that is a multiple of the cache line size of first cache 14. For example, if first cache 14 has a cache line size (512 bytes) of 128 bytes, second cache 16 may be defined to have a cache line size that is four times larger than first cache 14. By having a cache line size in second cache 16 that is a multiple of the cache line size in first cache 14, information in cache 16 may be arranged in sub-block sizes that equal the cache line size of first cache 14, facilitating the transfer of information between first cache 14 and second cache 16.

Cache hits for information in second cache 16 cannot be serviced directly in second cache 16 because second cache 16 is limited to a read-only constraint in the preferred embodiment of the present invention. Limiting second cache 16 to read-only operations results in the present invention achieving higher cache memory bandwidth as described in detail below.

Figure 2:
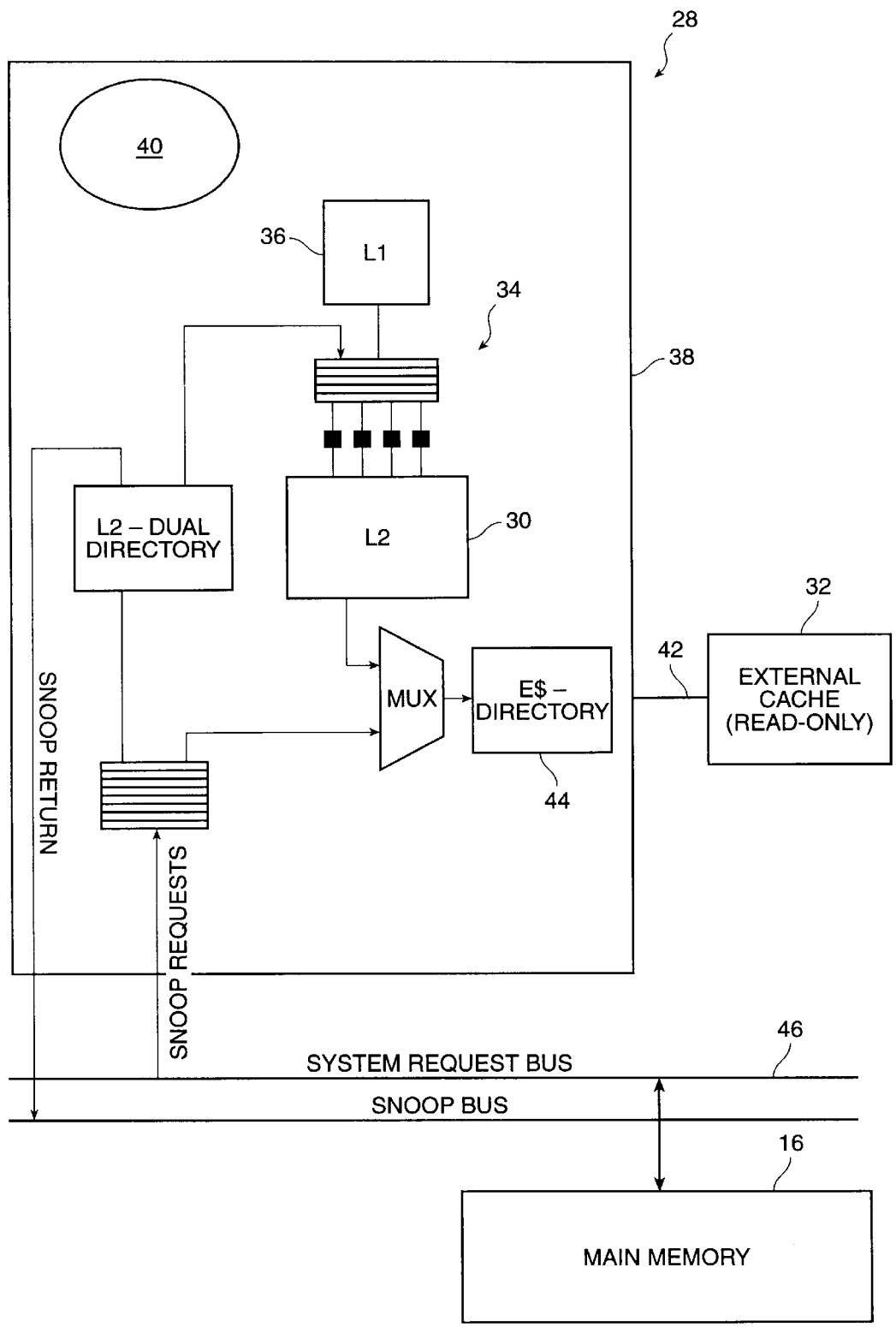
FIG. 2 is a block diagram illustrating a computer system having a non-inclusive hierarchical cache memory system in accordance with a preferred embodiment of the present invention.

FIG. 2 is a block diagram illustrating a system 28 having a non-inclusive hierarchical cache memory system in accordance with a preferred embodiment of the present invention.

Referring to FIGS. 1–2, in the preferred embodiment of the present invention, first cache 14 and second cache 16 are implemented as a level two cache 30 and a level three cache 32, respectively, in a cache unit 34 having a total of three caches. First cache 14 and second cache 16 are not intended to be limited to this implementation but may be of different cache levels in the cache hierarchy so long as first cache 14 is at least a level above the second cache 16 in the cache hierarchy and first cache 14 has a shorter or equal cache latency or access time than second cache 16 (i.e., first cache 14 is "faster" than second cache 16).

Cache unit 34 also includes a third cache, which is a level one cache 36 in this embodiment. Thus, the cache hierarchy for cache unit 34 is defined with second cache 16 being below first cache 14 and the third cache being above second cache 16. Because there are a total of three caches in cache unit, first cache 14, second cache 16, and the third cache are defined as level two, level three, and level one caches, respectively.

A level one cache is intended to hold information that is most likely to be used frequently by the processor. The lower cache levels, level two and/or level three, depending on the total number of caches a processor has, are generally slower than the level one cache, but are able to hold more information. Thus, a processor will first look for the information it needs in the level one cache, then the level two cache, and then the level three cache. As known in the art, if the information is not found in any of the cache levels, a cache miss will be broadcast to the system request bus to locate the information either in another processor's cache (in multiprocessor systems) or in main memory.

Level one cache 36 and level two cache 30 share the same silicon die 38 with a processor 40 (on-chip), while level three cache 32 remains part of cache unit 34 through an external cache bus 42 (off-chip). On-chip caches tend to be smaller with faster access times, whereas off-chip caches tend to be larger with slower access times.

Level two cache and level three cache in cache unit 34 are non-inclusive with respect to each other, while level one cache may or may not be non-inclusive with respect to either level two cache and/or level three cache. In a non-inclusive cache hierarchy, the lower level of the cache memory hierarchy does not necessarily contain the subsets of all upper levels of cache. This provides the advantage of minimizing the number of tags and states that must be provided for each lower level of cache as compared to each lower level of cache in an inclusive cache hierarchy. In an inclusive cache hierarchy, the lower level of the cache memory hierarchy is a superset of all of the upper levels.

Cache coherency is provided through a hardware solution using a snoop protocol which is generally known to one ordinarily skilled in the art.

Level three cache 32 is limited to operating under read-only constraints and receiving write-invalidation snoop requests. Operating under read-only constraints precludes store operations directed to a cache line in level three cache 32 from being serviced unless the requesting client such as processor 40 asks for permission first. For example, under a MOESI cache coherency protocol, if a processor has a cached copy in an "exclusive" state, the processor can safely read and write to the data copy without checking other caches for another data copy or informing other processors (in a multiprocessor system) because the data copy is exclusive. When a processor has a "read-only" copy, it means that there is a potential that more than one data copy of the same memory location is kept in other caches in the system.

Authors Paul Sweazey and Alan Jay Smith describe the MOESI protocol in *A Class of Compatible Cache Consistency Protocols and their Support by the IEEE futurebus*, IEEE, 1996, which disclosure is hereby incorporated by reference.

When a processor modifies its local copy, it may cause inconsistency between copies of information, and if not accounted for may result in the subsequent use of that data ("stale data") in a subsequent transaction or by another processor in a multiprocessor system. Thus, in a single processor system cache lines that are stored in level three cache 32 that are to be modified or changed requires processor 40 to send write invalidations to the other caches.

In a multiprocessor system the write invalidations are sent using snoop requests to other processors. When a processor receives a snoop requesting a write invalidation, it removes the addressed data copy from its local cache. Thus, the requesting processor procures the "permission" or the "ownership" for the accessed location, giving the processor an exclusive copy of the information in the system.

Also, only snoops relating to write-invalidation requests are passed to a directory 44 which has tags and state information corresponding to level three cache 32. Limiting snoop requests to write invalidation requests minimizes snoops to level three cache 32, increasing the amount of cache memory bandwidth available for servicing catch fetches by level three cache 32. In the event that a cache hit occurs in level three cache 32, the information found in level three cache 32 must be transferred to level two cache 30 before a modification can be made to that information.

Also, because level three cache 32 is subject to only write-invalidation snoops, directory 44 holding the tag and state information for level three cache 32 is reduced in size. This reduction in directory size is significant because only a single bit needs to be encoded to maintain the cache coherency protocol under MOESI. This enables cache directory 44 to be placed on-chip, further increasing the bandwidth of the third cache since its directory can be directly accessed by processor 40 without going through external cache bus 42.

Snoops may be generated by processor 40 or from another processor if the present invention is applied to a multiprocessor system. Snoops arising from another processor are sent through a system request bus 46.

The above described advantages are increased when the cache structure is replicated in a multiprocessor system that uses a snoop-based coherency protocol. Because for each processor/cache unit combination used, a snoop is generated each time information in the cache unit is changed or invalidated. Moreover, the snoop must be serviced by the other processor/cache units to ensure that coherency is maintained. Consequently, snoop traffic within each cache unit increases as the number of cache units used in a multiprocessor increases.

In addition, due to the high instruction and data bandwidth required by having multiple processors, cache line state and tag information for all levels of cache should be quickly accessible so that snoops may be serviced promptly, minimizing read and write latency to the caches. Such multiprocessor systems benefit from having cache state and tag information on the same silicon real estate as the processor ("on-chip"). However, having state and tag information "on-chip" reduces silicon real estate that can be made available for processor circuitry, rendering the approach expensive when compared to off-chip designs. Thus, the present invention provides the added advantage of using a minimal number of states per cache line for the level three cache due to its non-inclusive implementation, resulting in a minimal amount of silicon real estate used.

Figure 3:
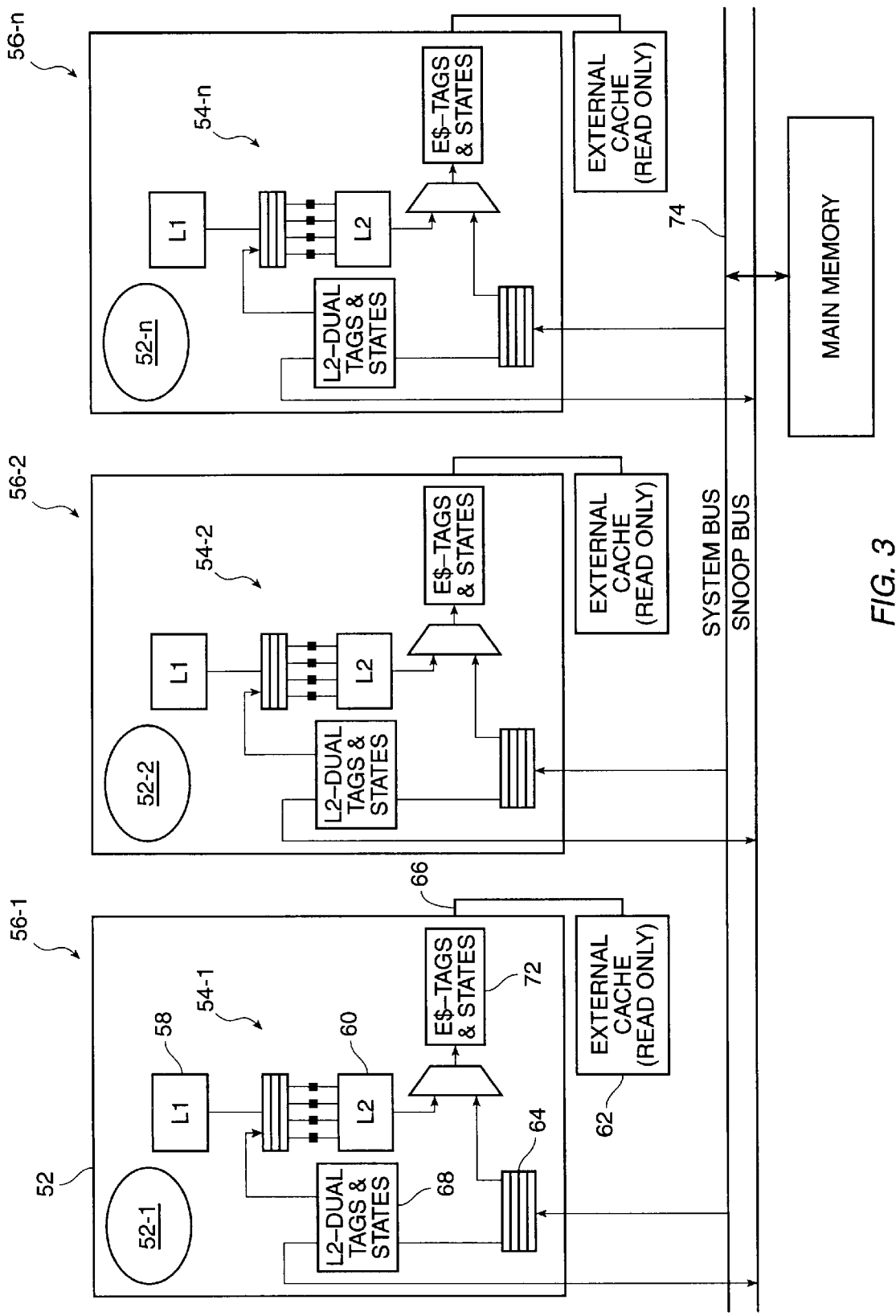
FIG. 3 shows a multiprocessor system having non-inclusive hierarchical cache units employing a snoop-based coherency protocol in accordance with an alternative embodiment of the present invention.

FIG. 3 shows a multiprocessor system having non-inclusive hierarchical cache units employing a snoop-based coherency protocol in accordance with an alternative embodiment of the present invention.

As shown in FIG. 3, a multiprocessor system 50 includes processors 52-1 through 52-n and cache units 54-1 through 54-n which are grouped together in processor/cache unit combinations 56-1 through 56-n. To avoid over-complicating the following discussion, processor/cache unit combination 56-2 through 56-n are intended to contain the same features as processor cache unit combination 56-1 and are thus not disclosed in detail but are intended to contain all of the novel features disclosed. Each cache unit 54-1 through 54-n in processor/cache unit combination 56-1 through 56-n contains three levels of cache, first cache 58, second cache 60, and third cache 62, that are organized in hierarchical levels.

The cache hierarchy is defined with second cache 60 being below first cache 58 and third cache 62 being below second cache 60. Because there are a total of three caches in cache unit 54-1 having the hierarchy just defined, first cache 58, second cache 60, and third cache 62 are defined as level one, level two, and level three caches, respectively. First cache 58 and second cache 60 share the same silicon die 52 with processor 52-1 (on-chip), while third cache 62 remains part of cache unit 54-1 through an external cache bus 66 (off-chip). Third cache 62 is not only a level three cache but may be referred to as an external cache. On-chip caches tend to be smaller with faster access times, whereas off-chip caches tend to be larger with slower access times.

Level two cache and level three cache in cache unit 14 are non-inclusive with respect to each other, while level one cache may or may not be non-inclusive with respect to either level two cache and/or level three cache. In a non-inclusive cache hierarchy, the lower level of the cache memory hierarchy does not necessarily contain the subsets of all upper levels of cache. This provides the advantage of minimizing the number of tags and states that must be provided for each lower level of cache as compared to each lower level of cache in an inclusive cache hierarchy.

In an inclusive cache hierarchy, the lower level of the cache memory hierarchy is a superset of all of the upper levels. This results in the tags and states stored in cache directories of upper levels of cache to be also stored in every lower level of cache used. The redundancy in states and tags creates rising overhead costs with respect to the size of the lower level cache directories and the speed in which these directories may be searched for a cache hit as the size of the lower level caches or number of caches increase. The use of non-inclusive caches avoids the overhead costs just described.

Cache coherency is provided through a hardware solution using a snoop protocol. To minimize the number of snoop requests (snoops) received by second cache 60 and third cache 62, a dual directory 68 is provided to filter snoops directed to second cache 64. All snoops are passed to dual directory 68 by snoop queue 60, while only snoops relating to write-invalidation requests are passed to a directory 72 holding tags and state information corresponding to third cache 62. This increases the available cache bandwidth that can be made available by second cache 60 since the number of snoops appropriating the cache bandwidth of second cache 60 are reduced by the filtering effect of dual directory 68. Note that in the preferred embodiment of the present invention, the use of dual directory 68 to filter snoops directed to second cache 60 is not intended to be limiting. Other embodiments may be used such as sending snoops from snoop queue 60 directly to second cache 60 without using dual directory 68.

Third cache 62 is limited to holding read-only information and receiving write-invalidation snoop requests. Limiting snoop requests to write invalidation requests minimizes snoop requests to third cache 62, increasing the amount of cache memory bandwidth available for servicing catch fetches from third cache 62. In the event that a cache hit occurs in third cache 62, the information found in third cache 62 must be transferred to second cache 60 before a modification can be made to that information.

Also, because third cache 62 is subject to only write-invalidation snoops, directory 72 holding the tag and state information for third cache 62 is reduced in size.

This reduction in directory size is significant in that only a single bit needs to be encoded to maintain the cache coherency protocol under MOESI. This enables directory 72 to be placed on-chip, further increasing the bandwidth of third cache 62 since directory 72 can be directly accessed by processor 52-1 without going through external cache bus 66.

System request bus 74 is used by each processor/cache unit combination to broadcast snoop requests among each other. For example, third cache 62 is not a superset of first cache 58 and level two cache 60. Thus, snoops must be sent to second cache directory 72 and to dual directory 68 to filter out inapplicable snoop traffic, if second cache 60 maintains inclusion of all first cache 58 data. As would be evident to one of ordinary skill in the art, if second cache 60 does not maintain inclusion of all first cache 58 information (each cache level are non-inclusive with respect to each other), snoop requests must also be sent to first cache 58 because they would not be filtered out by second cache 60. All snoop requests are moved through the processor according to a FIFO scheme although this is not intended to limit the invention in anyway. If a strict FIFO constraint is used to process all snoop requests, later requests that could be quickly processed will be delayed by earlier requests that take more time to process.

Method of Operation

Figure 4:
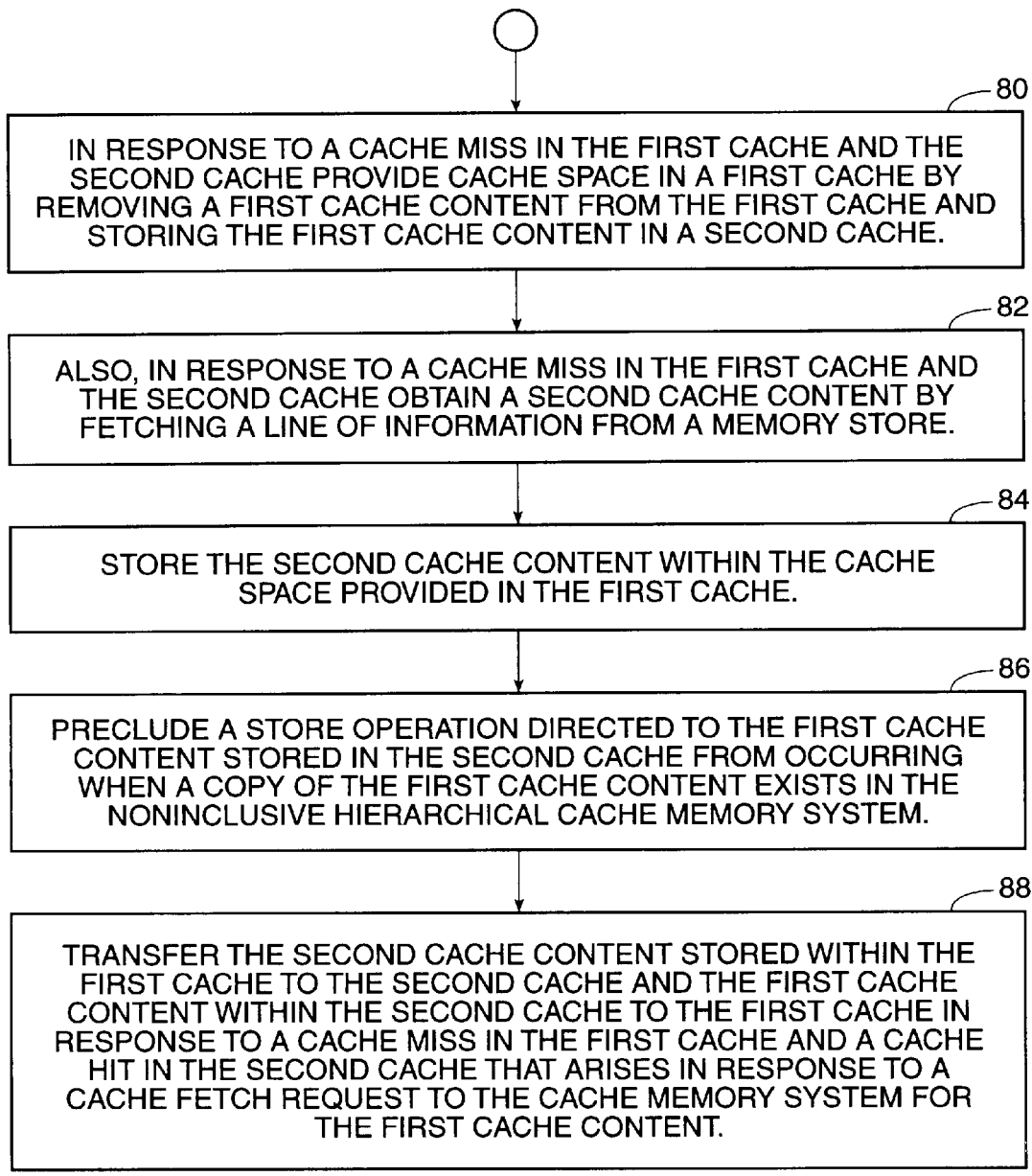
FIG. 4 is a process diagram illustrating a method for optimizing a cache memory system in accordance with a presently preferred embodiment of the present invention.

FIG. 4 is a process diagram illustrating a method for optimizing a cache memory system in accordance with a presently preferred embodiment of the present invention.

At step 80, in response to a cache miss in a first cache and a second cache, a cache space is provided in a first cache by removing a first cache content from the first cache and storing the first cache content in a second cache. As described above, the first and second caches are level two and level three caches in a three cache non-inclusive hierarchical cache unit or system. The term cache content is defined as any information held by a cache line or block.

At step 82, a second cache content is obtained by fetching a line of information from a memory store in response to the cache miss in the first cache and the second cache.

At step 84, the second cache content is stored within the cache space provided in the first cache.

At step 86, a store operation is precluded from occurring when the store operation is directed to the first cache content stored in the second cache when a copy of the first cache content exists in the non-inclusive hierarchical cache memory system.

At step 88, the second cache content stored within the first cache is transferred to the second cache and the first cache content within the second cache is transferred to the first cache in response to a cache miss in the first cache and a cache hit in the second cache which arise in response to a cache fetch request to the cache memory system for the first cache content.

While embodiments and applications of this invention have been shown and described, it would be apparent to those skilled in the art that many more modifications than mentioned above are possible without departing from the inventive concepts herein. The invention therefore, is not to be restricted except in the spirit of the appended claims.

What is claimed is:

1. A method for optimizing a non-inclusive hierarchical cache memory system, comprising the steps of:

providing cache space in a first cache by removing a first cache content from said first cache and storing said first cache content in a second cache, said step of providing in response to a cache miss in said first cache and said second cache;

obtaining a second cache content by fetching a line of information from a memory store in response to said cache miss in said first cache and said second cache;

storing said second cache content within said cache space provided in said first cache;

defining said first cache content as a read-only copy in said second cache; and transferring said second cache content stored within said first cache to said second cache and said first cache content within said second cache to said first cache in response to a cache miss in said first cache and a cache hit in said second cache that arises in response to a cache fetch request to the cache memory system for said first cache content.

2. The method in claim 1, further including the step of creating and maintaining tags and states which correspond to said second cache, said tags and states located on the same silicon real estate as a corresponding processor, one of said tags having a bit for indicating the validity of a cache line within said second cache.

3. The method in claim 1, wherein said second cache is an external cache.

4. The method in claim 1, further including the step of defining said first cache as a level two cache.

5. The method of claim 4, further including a step of rendering said second cache responsive to a cache hit resulting from a write request originating from another processor, said second cache responding by marking invalid a cache line that corresponds to said cache hit.

6. The method in claim 1, further including the step of defining said second cache as a level three cache.

7. The method of claim 1, further including a step of rendering said second cache responsive to a cache hit resulting from a write request originating from another processor, said second cache responding by marking invalid a cache line that corresponds to said cache hit.

8. A method for improving memory latency in a non-inclusive hierarchical cache memory system, comprising the steps of:

providing cache space in a first cache by removing a first cache content from said first cache and storing said first cache content in a second cache, said step of providing in response to a cache miss in said first cache and said second cache, said second cache operating under read-only constraints;

obtaining a second cache content by fetching a line of information from a memory store in response to said cache miss in said first cache and said second cache;

storing said second cache content within said cache space provided in said first cache;

defining said first cache content as a read-only copy in said second cache;

transferring said second cache content stored within said first cache to said second cache and said first cache content within said second cache to said first cache in response to a cache miss in said first cache and a cache hit in said second cache that arises in response to a cache fetch request to the cache memory system for said first cache content; and creating and maintaining tags and states which correspond to said second cache, said tags and states located on the same silicon real estate as a corresponding processor, one of said tags having a bit for indicating the validity of a cache line within said second cache.

9. The method in claim 8, further including the step of defining said first cache as a level two cache.

10. The method in claim 8, further including the step of defining said second cache as a level three cache.

11. A method for improving the rate of cache hits while minimizing cache coherency overhead in a cache memory system, the method comprising the steps of:

providing cache space in a first cache by removing a first cache content from said first cache and storing said first cache content in a second cache, said step of providing in response to a cache miss in said first cache and said second cache;

obtaining a second cache content by fetching a line of information from a memory store in response to said cache miss in said first cache and said second cache;

storing said second cache content within said cache space provided in said first cache;

defining said first cache content as a read-only copy in said second cache;

transferring said second cache content stored within said first cache to said second cache and said first cache content within said second cache to said first cache in response to a cache miss in said first cache and a cache hit in said second cache that arises in response to a cache fetch request to the cache memory system for said first cache content;

creating and maintaining tags and states which correspond to said second cache, said tags and states located on the same silicon real estate as a corresponding processor, one of said tags having a bit for indicating the validity of a cache line within said second cache;

defining said first cache as a level two cache; and defining said second cache as a level three cache.

12. The method of claim 11, further including a step of rendering said second cache responsive to a cache hit resulting from a write request originating from another processor, said second cache responding by marking invalid a cache line that corresponds to said cache hit.

13. An apparatus for optimizing a non-inclusive hierarchical cache memory comprising:

a first cache for storing cache content;

a second cache responsive to receiving a first cache content from said first cache when a cache miss in said first cache and said second cache for a second cache content occurs, said second cache defining said first cache content as a read-only copy; and a second cache content obtained from a memory store in response to said cache miss in said first cache and said second cache, said second cache content stored in said first cache, said second cache content transferable from said first cache to said second cache and said first cache content transferable from said second cache to said first cache in, response to a cache miss in said first cache and a cache hit in said second cache that arises in response to a fetch request to said cache memory system.

14. The apparatus in claim 13, further including a directory for holding tags and states which correspond to said second cache, said directory located on the same silicon real estate as a corresponding processor, one of said tags having a bit for indicating the validity of a cache line within said second cache.

15. The apparatus in claim 13, wherein said second cache is an external cache.

16. The apparatus in claim 13, wherein said first cache is defined as a level two cache.

17. The apparatus in claim 13, wherein said second cache is defined as a level three cache.

18. The apparatus in claim 13, further including a processor coupled to said first cache and said second cache; a system request bus coupled to said first cache and said second cache; and a main memory store coupled to said system request bus.

19. The apparatus of claim 13, wherein said second cache is responsive to a cache hit resulting from a write request originating from another processor, said second cache responding by marking invalid a cache line that corresponds to said cache hit.

20. An apparatus for improving memory latency in a non-inclusive hierarchical cache comprising:

a cache line in a first cache, said cache line obtained by removing a first cache line from said first cache in response to a cache miss in said first cache and a second cache, said second cache for storing said first cache line from said first cache, said second cache defining said first cache content as a read-only copy in said second cache;

a second cache line in said first cache, said first cache line in said second cache moved to said first cache in response to a cache miss in said first cache and a cache hit in said second cache, said cache miss and said cache hit in said first cache and said second cache, respectively, occurring in response to a fetch request to said cache memory system; and tags and states which correspond to said second cache, said tags and states located on the same silicon real estate as a corresponding processor, one of said tags having a bit for indicating the validity of a cache line within said second cache.

21. The apparatus in claim 20, wherein said first cache is defined as a level two cache.

22. The apparatus in claim 20, wherein said second cache is defined as a level three cache.

23. An apparatus for minimizing main memory fetches due to cache misses in a cache memory system comprising:

a cache line in a first cache, said cache line obtained by removing a first cache line from said first cache in response to a cache miss in said first cache and a second cache, said second cache for storing said first cache line from said first cache, said second cache defining said first cache content as a read-only copy in said second cache;

a second cache line in said first cache to said second cache and said first content in said second cache to said first cache in response to a cache miss in said first cache and a cache hit in said second cache, said cache miss and said cache hit in said first cache and said second cache, respectively, occurring in response to a fetch request to said cache memory system;

tags and states which correspond to said second cache, said tags and states located on the same silicon real estate as a corresponding processor;

defining said first cache as a level two cache; and defining said second cache as a level three cache.

24. The apparatus of claim 23, wherein said second cache is responsive to a cache hit resulting from a write request originating from another processor, said second cache responding by marking invalid a cache line that corresponds to said cache hit.

25. The apparatus of claim 20 wherein said second cache is responsive to a cache hit resulting from a write request originating from another processor, said second cache responding by marking invalid a cache line that corresponds to said cache hit.

26. An apparatus for minimizing main memory fetches due to cache misses in a cache memory system, comprising:

a cache line in a first cache, said cache line obtained by removing a first cache line from said first cache in response to a cache miss in said first cache and a second cache, said second cache for storing said first cache line from said first cache, said second cache precluded from servicing a store operation corresponding to said first cache line when a copy of information corresponding to said first cache line exists in the cache memory;

a second cache line in said first cache to said second cache and said first content in said second cache to said first cache in response to a cache miss in said first cache and a cache hit in said second cache, said cache miss and said cache hit in said first cache and said second cache, respectively, occurring in response to a fetch request to said cache memory system;

tags and states which correspond to said second cache, said tags and states located on the same silicon real estate as a corresponding processor;

defining said first cache as a level two cache; and defining said second cache as a level three cache.

27. The apparatus in claim 26, further including a processor coupled to said first cache and said second cache; a system request bus coupled to said first cache and said second cache; and a main memory store coupled to said system request bus.

28. A method for providing a computer system comprising the steps of:

providing a non-inclusive hierarchical cache memory system including:

a second cache responsive to receiving a first cache content from said first cache when a cache miss in said first cache and said second cache for a second cache content occurs;

said second cache defining said first cache content as a read-only copy in said second cache; and a second cache content obtained from a memory store in response to said cache miss in said first cache and said second cache, said second cache content stored in said first cache, said second content transferable from said first cache to said second cache and said first content transferable from said second cache to said first cache in response to a cache miss in said first cache and a cache hit in said second cache that arises in response to a fetch request to said cache memory system.

29. The method of claim 28, wherein said second cache is responsive to a cache hit resulting from a write request originating from another processor, said second cache responding by marking invalid a cache line that corresponds to said cache hit.

* * * * *

UNITED STATES PATENT AND TRADEMARK OFFICE
CERTIFICATE OF CORRECTION

PATENT NO. : 5,909,697
DATED : June 1, 1999
INVENTOR(S) : Norman Hayes, Rick Hetherington, Belliappa Kuttanna, Fong Pong, and Krishna Thatipelli It is certified that error appears in the above-identified patent and that said Letters Patent is hereby corrected as shown below:

On column 3, lines 24-25, please delete "(512 bytes)".

On column 3, lines 26, after the phrase "a cache line size" please insert -- (512 bytes)--.

On column 6, lines 66, please replace "level two" with --second--.

On column 6, lines 67, please replace "second" with --level three--.

On column 6, line 31, please replace "64" with --60--.

On column 6, line 33, please replace "60" with --64--.

Signed and Sealed this

Eighteenth Day of January, 2000

*Attest:*

Q. TODD DICKINSON

*Attesting Officer*  Commissioner of Patents and Trademarks